United States Patent
Bjorstrom et al.

(10) Patent No.: US 7,068,471 B1
(45) Date of Patent: *Jun. 27, 2006

(54) LOW STIFFNESS GIMBAL FOR DISK DRIVE HEAD SUSPENSIONS

(76) Inventors: Jacob D. Bjorstrom, 1024 Larkspur La., Waconia, MN (US) 55387; Reid C. Danielson, 15303 43rd St., Cokato, MN (US) 55321; Catherine A. Morley, 6243 180th St., Lester Prairie, MN (US) 55354

( * ) Notice: Subject to any disclaimer, the term of this patent is extended or adjusted under 35 U.S.C. 154(b) by 0 days.

This patent is subject to a terminal disclaimer.

(21) Appl. No.: 10/909,566

(22) Filed: Aug. 2, 2004

Related U.S. Application Data

(62) Division of application No. 09/952,042, filed on Sep. 13, 2001, now Pat. No. 6,788,498.

(51) Int. Cl.
*G11B 21/16* (2006.01)

(52) U.S. Cl. .................................................. 360/245.9
(58) Field of Classification Search .............. 360/245.9
See application file for complete search history.

(56) References Cited

U.S. PATENT DOCUMENTS

| 6,741,426 B1 * | 5/2004 | Girard ..................... 360/245.4 |
| 2003/0007292 A1 * | 1/2003 | Himes et al. ............ 360/245.9 |

* cited by examiner

*Primary Examiner*—A. J. Heinz
*Assistant Examiner*—Mark Blouin
(74) *Attorney, Agent, or Firm*—Faegre & Benson, LLP

(57) ABSTRACT

A gimbal and load beam apparatus for a head suspension for a disk drive having lateral arms with dielectric and conductor layers without metal backing to provide for low pitch and roll stiffness while also having a structural layer attached to the gimbal at proximal and distal locations for high lateral stiffness. The structural layer may be formed of stainless steel and can serve as the load beam and spring region for the head suspension.

18 Claims, 18 Drawing Sheets

LOW STIFFNESS GIMBAL FOR DISK DRIVE HEAD SUSPENSIONS

CROSS REFERENCE TO RELATED APPLICATION

This application is a division of application Ser. No. 09/952,042 filed Sep. 13, 2001 now U.S. Pat. No. 6,788,498. The entire contents of application Ser. No. 09/952,042 are hereby incorporated by reference.

BACKGROUND OF THE INVENTION

The present invention relates to the field of read/write head suspensions for disk drives, more particularly to a gimbal and load beam arrangement for carrying a head slider in such head suspensions.

Gimbals for head suspensions are required to maintain the read/write head at a desired orientation to a rotating disk with which they cooperate to read and write data with respect thereto. It is desirable to have compliance or flexibility in both roll and pitch dimensions for such heads, to allow the head to follow variations in the disk surface. At the same time, it is desirable to have the gimbal and overall head suspension be relatively stiff in a lateral dimension to enable accurate tracking and fast response times to slew commands calling for a track change.

Prior art designs typically had a stainless steel layer in a pair of gimbal arms, providing sufficient lateral stiffness, at the expense of reduced flexibility in the roll and pitch dimensions. One attempt to address these conflicting requirements was a gimbal and head suspension referred to as FgSA from Innovex, at 5540 Pioneer Creek Drive, Maple Plain, Minn. 55359. The FgSA product had low pitch and roll stiffness, since the gimbal arms had no stainless steel backing. The FgSA product was attached to a load beam by glue at proximal and distal ends of the gimbal. Absence of stainless steel in the FgSA product prevented welding of the gimbal to the load beam, and increased the difficulty of bonding the head after flexure attachment. Another approach is shown in U.S. Pat. No. 5,844,751, assigned to the assignee of the present invention. In this patent, the stainless steel layer is omitted, resulting in low pitch and roll stiffness, but also with low lateral stiffness.

The present invention overcomes shortcomings of the prior art by providing a gimbal and load beam arrangement with a structural layer, preferably stainless steel, but with the structural layer omitted from the lateral arms of the gimbal, and wherein the gimbal is joined to the structural layer at locations distal and proximal of the gimbal region, to provide both low stiffness for pitch and roll dimensions, while simultaneously providing high stiffness in the lateral dimension. The present invention further provides a central portion of the structural layer intermediate the proximal and distal locations to enable formation of a raised load point and to ease the difficulty of attaching the head after the gimbal is attached to the load beam. In present assemblies, the slider is attached adhesively, and then gold balls (using ultrasonic bonding) or solder is used to connect the head to the copper conductors on the gimbal. A further advantage is that when the structural layer is formed of stainless steel, it may be extended proximally of the load beam portion to form a spring region for the head suspension assembly between the load beam portion and the base plate. Finally, having a metal layer at the location distal of the gimbal enables inclusion of a headlift member into the design, and may include a layer of dielectric on the headlift, avoiding or reducing the potential for contamination of the disk drive environment with particles abraded off the load/unload ramp by the headlift.

BRIEF DESCRIPTION OF THE DRAWINGS

FIG. 13b is a plan view of the first alternative embodiment of the head suspension of FIG. 13a.

FIG. 13c is a perspective view of one side of the first alternative embodiment of FIG. 13a.

FIG. 13d is a perspective view of the other side of the first alternative embodiment of FIG. 13a.

FIG. 14b is a plan view of the second alternative embodiment of the head suspension of FIG. 14a.

FIG. 14c is a perspective view of one side of the second alternative embodiment of FIG. 14a.

FIG. 14d is a perspective view of the other side of the second alternative embodiment of FIG. 14a.

FIG. 15b is an exploded view of the assembly of FIG. 15a.

DETAILED DESCRIPTION OF THE INVENTION

Figure 1:
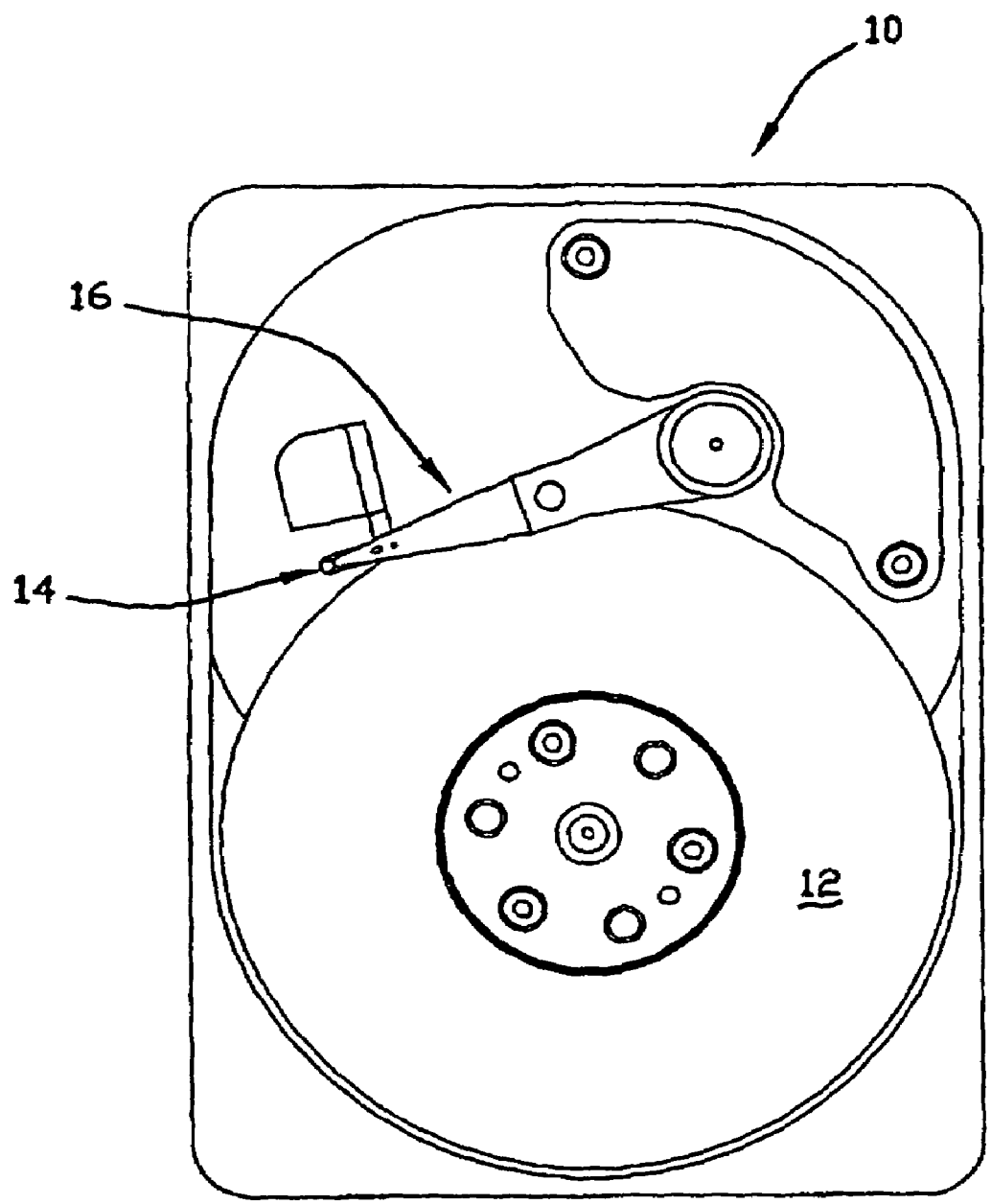
FIG. 1 is a top plan view of a prior art disk drive and head suspension assembly.

Referring now to the figures, and most particularly to FIG. 1, a disk drive assembly 10 to which the gimbal and load beam of the present invention is directed may be seen. Disk drive assembly 10 has a rotating disk 12 and a read/write head 14 carried by a head suspension 16 for reading data from and writing data to disk 12.

Figure 2:
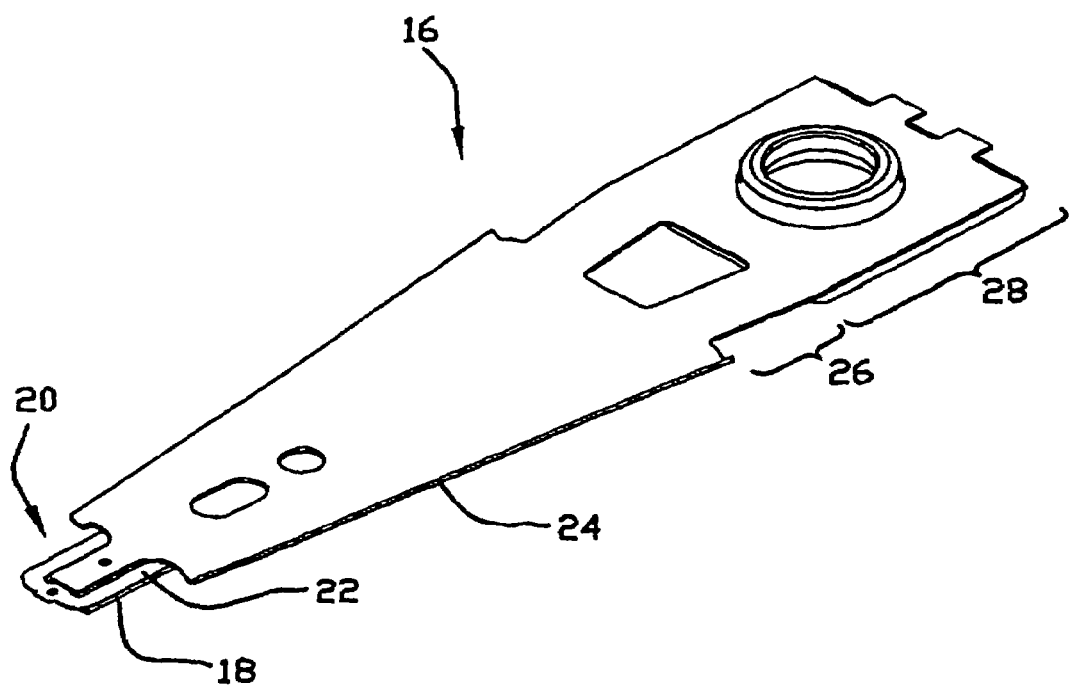
FIG. 2 is a perspective view of a prior art head suspension.
Figure 3:
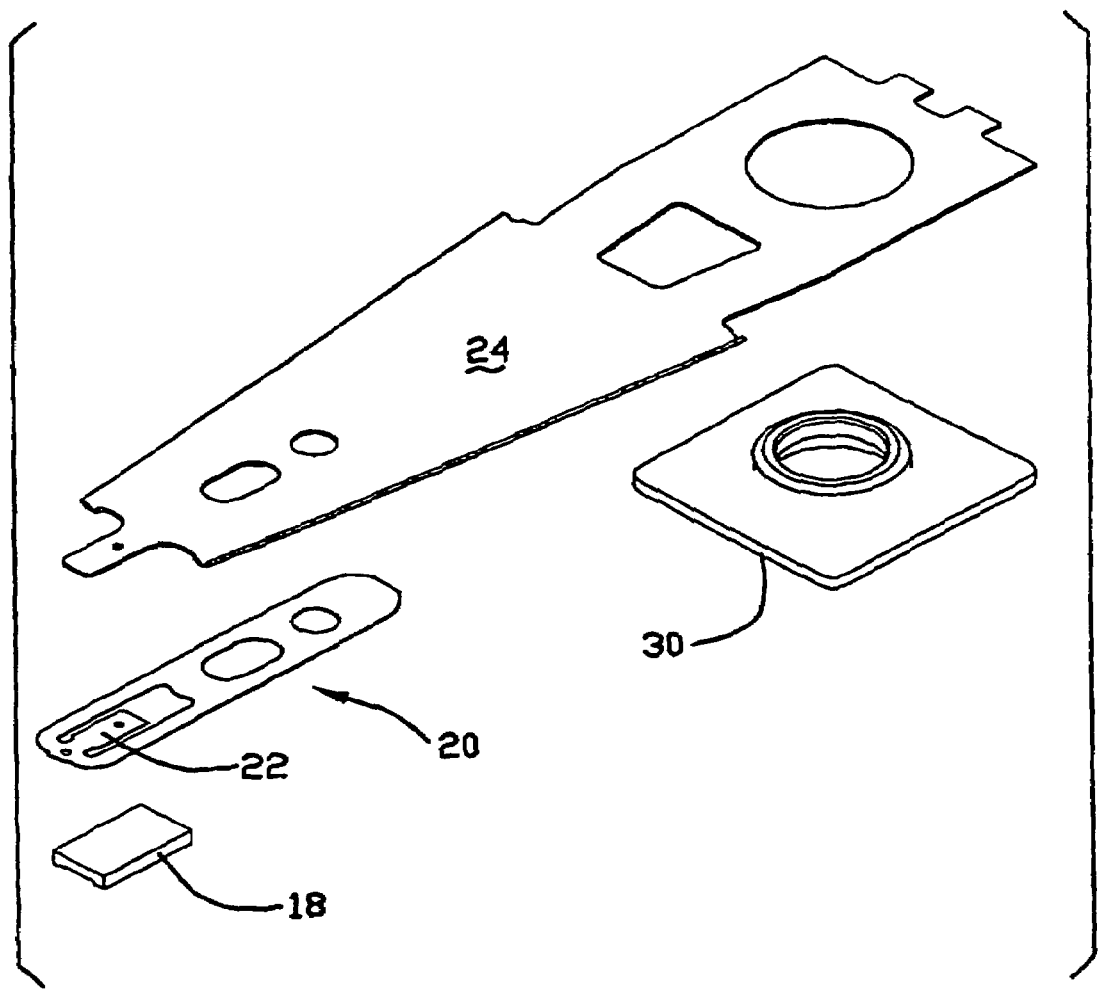
FIG. 3 is an exploded view of the prior art head suspension of FIG. 2.

Referring now also to FIGS. 2 and 3, the head suspension 16 has a head slider 18 carried by a gimballing mechanism 20 which is typically included on a flexure 22. Gimbal 20 is carried by a load beam 24 which typically has a spring region 26 and a mounting region 28. The mounting region is typically secured to a baseplate 30. The spring region provides a force, called "gram load" in a direction to urge the head slider 18 towards disk 12. In operation, an air bearing elevates the head slider 18 above the disk 12 and it is preferable that the gimbal 20 has low pitch and roll stiffness (to enable low flyheight) and high lateral stiffness (to enable faster operation).

Figure 4:
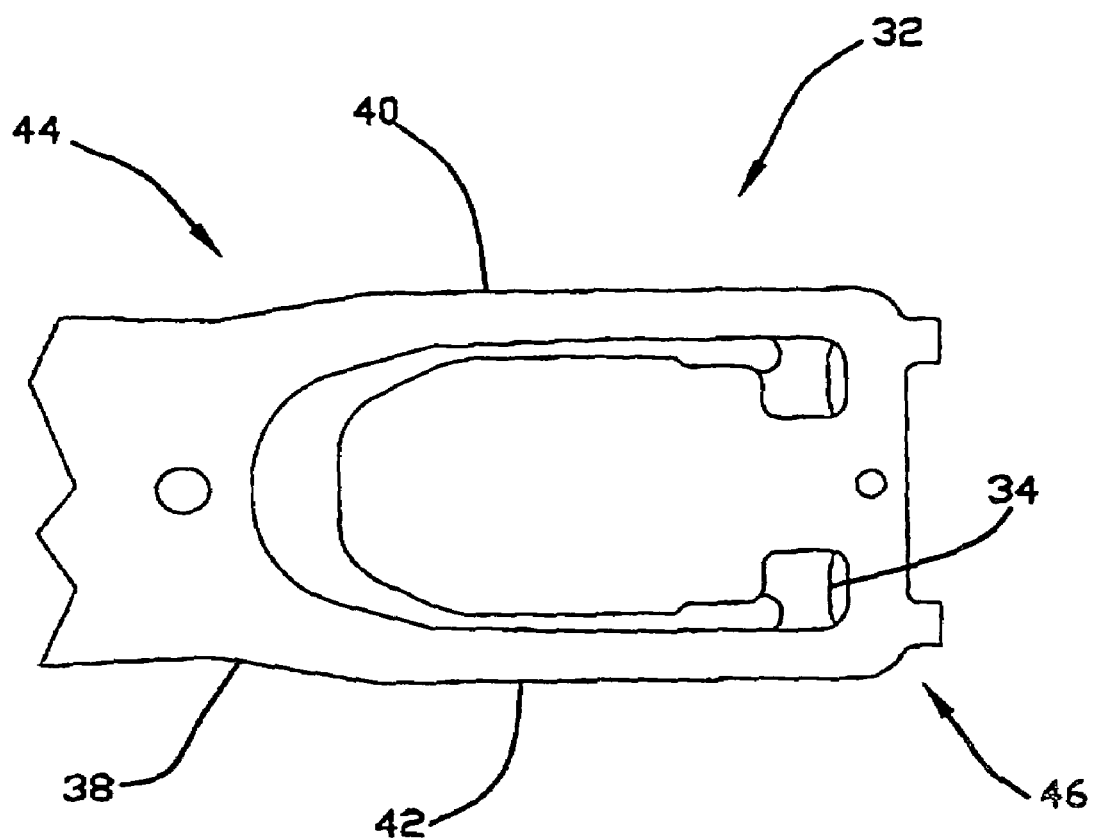
FIG. 4 is an enlarged fragmentary view of one side of a prior art gimbal.
Figure 5:
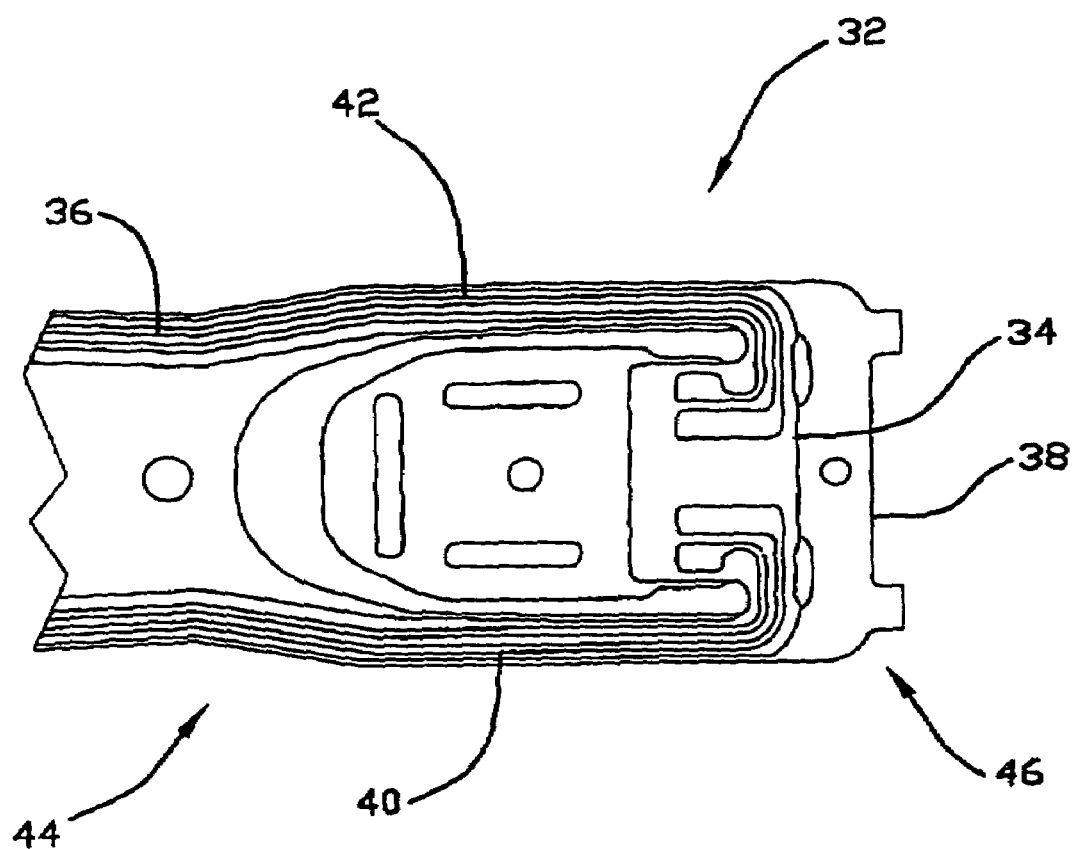
FIG. 5 is a view similar to FIG. 4, except of the other side of the prior art gimbal of FIG. 4.

FIGS. 4 and 5 illustrate an example prior art gimbal structure 32. Gimbal 32 was typically made up of 3 generally congruent layers, a dielectric layer 34, a conductive trace layer 36, and a stainless steel layer 38. The gimbal structure 32 had a pair of laterally spaced arms 40, 42 extending longitudinally along the gimbal from a proximal region 44 to a distal region 46. In this prior art structure, the stainless steel layer 38 extended along the full length of the gimbal lateral arms 40, 42 as may be most clearly seen in FIG. 4. While this arrangement provided sufficient lateral stiffness, it also increased the pitch and roll stiffness, limiting the compliance desired for the gimbal.

Figure 6:
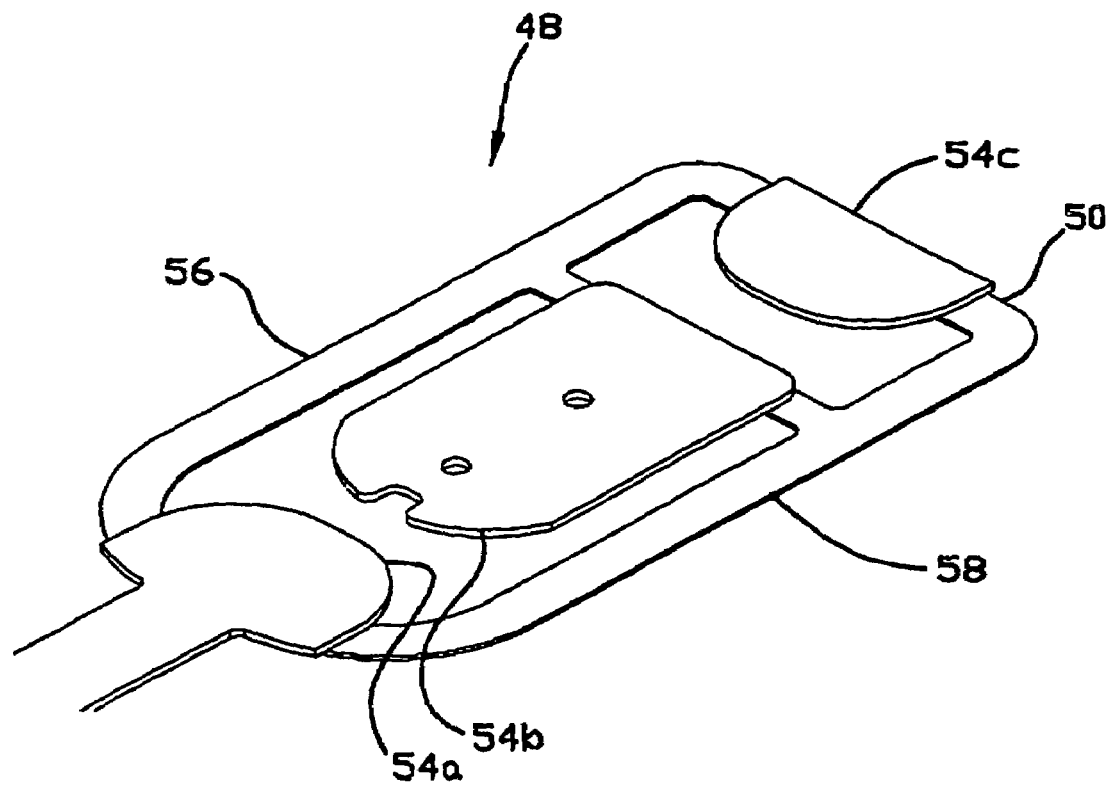
FIG. 6 is an enlarged fragmentary view of one side of a gimbal useful in the practice of the present invention.
Figure 7:
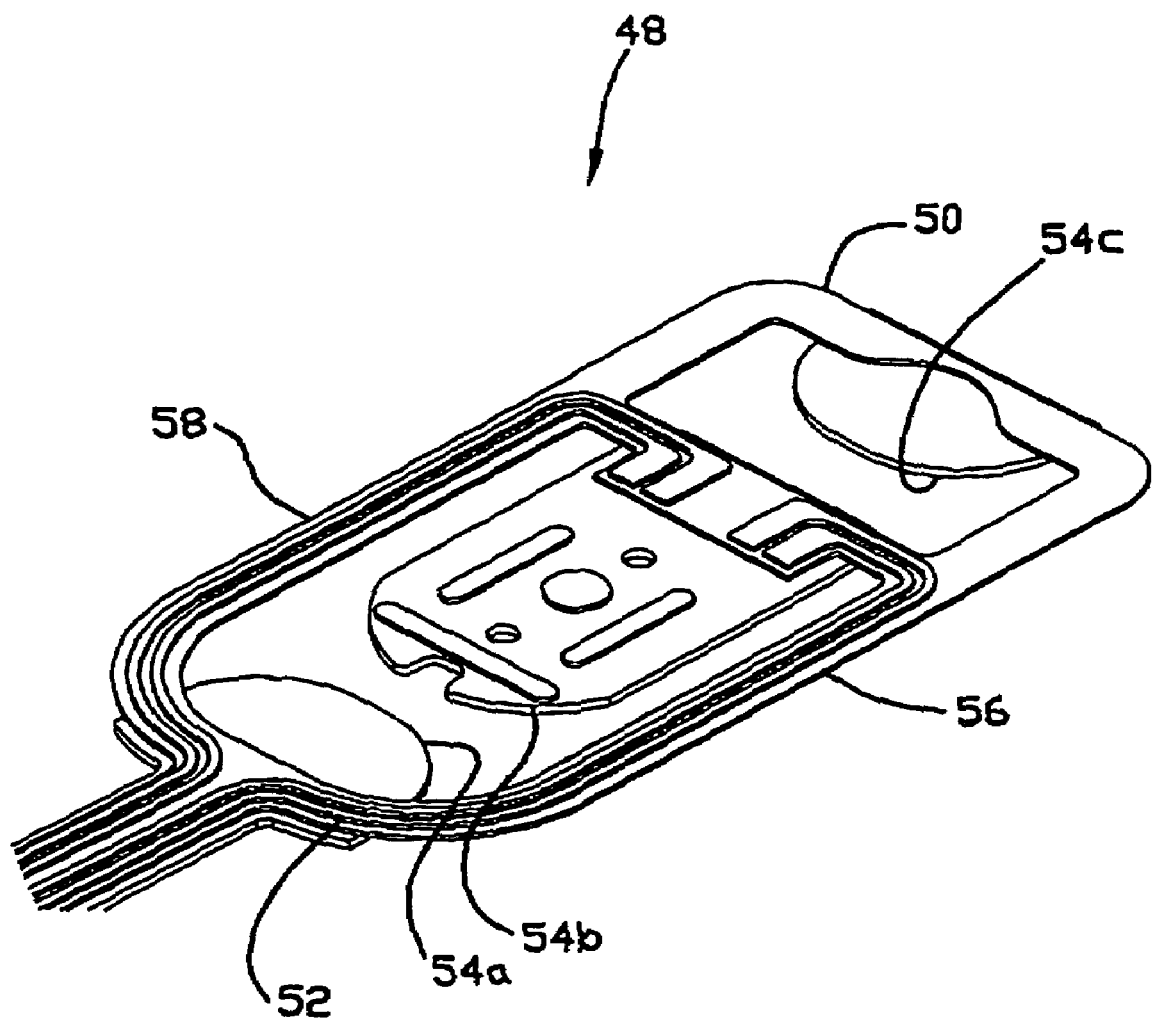
FIG. 7 is view similar to that of FIG. 6, except of the other side of the gimbal shown in FIG. 6.

Referring now to FIGS. 6 and 7, the present invention has a gimbal structure 48 formed of three layers, a dielectric layer 50, a trace layer 52, and a metal structural layer 54. As may be seen most clearly in FIG. 6, the structural layer 54 is omitted from the lateral arms 56, 58 made up of the dielectric layer 50 and trace layer 52. It has been found that this arrangement gives a relatively low stiffness in the pitch and roll dimensions for the gimbal 48.

Figure 8:
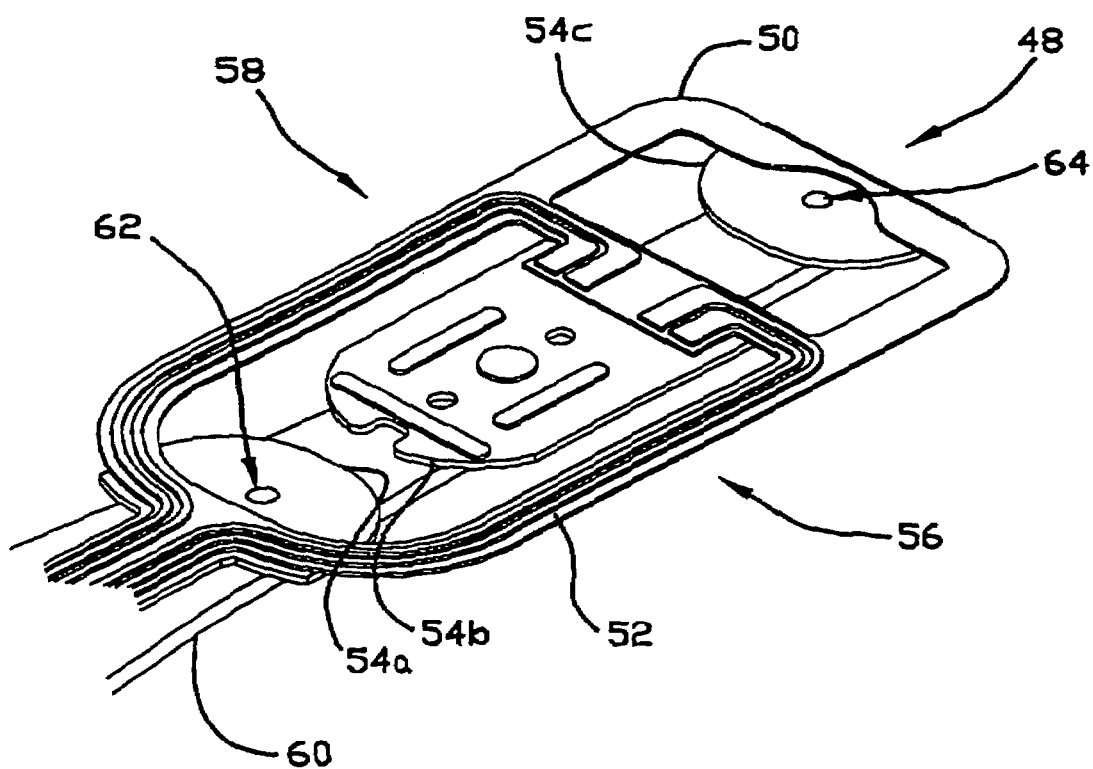
FIG. 8 is a fragmentary view of the gimbal of FIG. 6 attached to a load beam according to the present invention.
Figure 9:
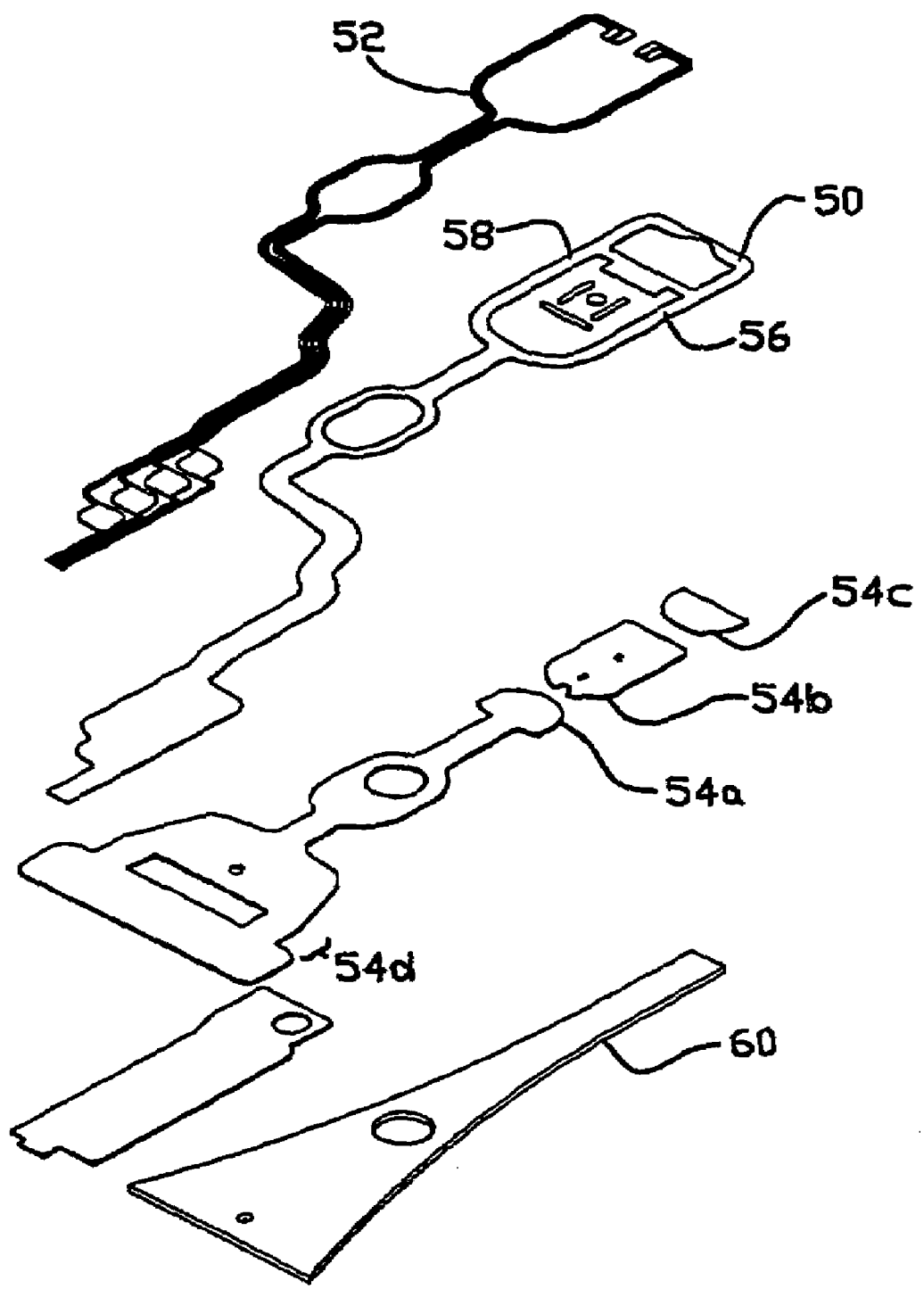
FIG. 9 is an exploded view of the gimbal and load beam of FIG. 8 useful in the practice of the present invention.
Figure 10:
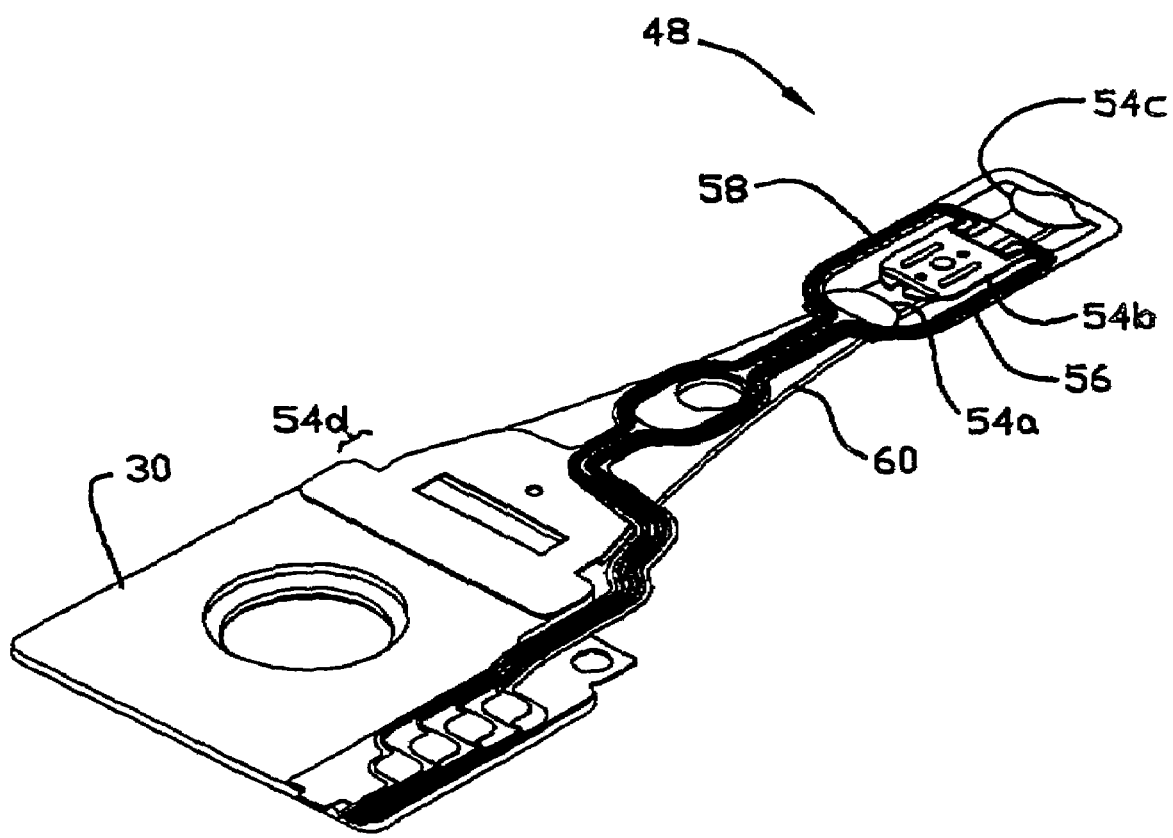
FIG. 10 is an assembly view of the gimbal and load beam of FIG. 8, together with a base plate.

Referring now also to FIGS. 8, 9, and 10, a load beam 60 is secured to the structural layer 54 at the proximal region 44 and the distal region 46, by proximal and distal attachment points 62, 64. The attachment points are preferably welds when the structural layer is made of the preferred material of stainless steel. These attachments provide a relatively high stiffness to the gimbal 48 in the lateral dimension. It is to be understood that load beam 60 is preferably a relatively rigid member, typically formed of stainless steel. As shown, the load beam 60 is 0.004" thick. However, it is to be understood that the load beam can be made of thinner material, with stiffening side rails formed therein.

As has been mentioned, supra, head suspensions require a gram load to be imposed on the head slider for proper operation. The gram load is achieved by forming a spring region to have the proper amount of force when the head slider is positioned at a predetermined distance from the plane of the baseplate. In the practice of the present invention, structural layer 54 may extend to form a spring region 54d, located between the load beam 60 and the baseplate 30, in addition to providing the gimbal structural layer in elements 54a, 54b, and 54c. This dual function for the structural layer is made possible by the absence of that layer in the lateral arms 56, 58 of the gimbal of the present invention, which allows the use of higher gauge (thicker) material for the structural layer 54, as is needed for the spring region 54d. The thickness of the stainless steel is 38 μm, the polyimide insulating layer is 18 μm thick, and the copper conductor layer is 18 μm thick. The structural layer 54 is typically attached at the spring region 54d by welding to the base plate 30, when layer 54 is made of stainless steel.

Figure 11:
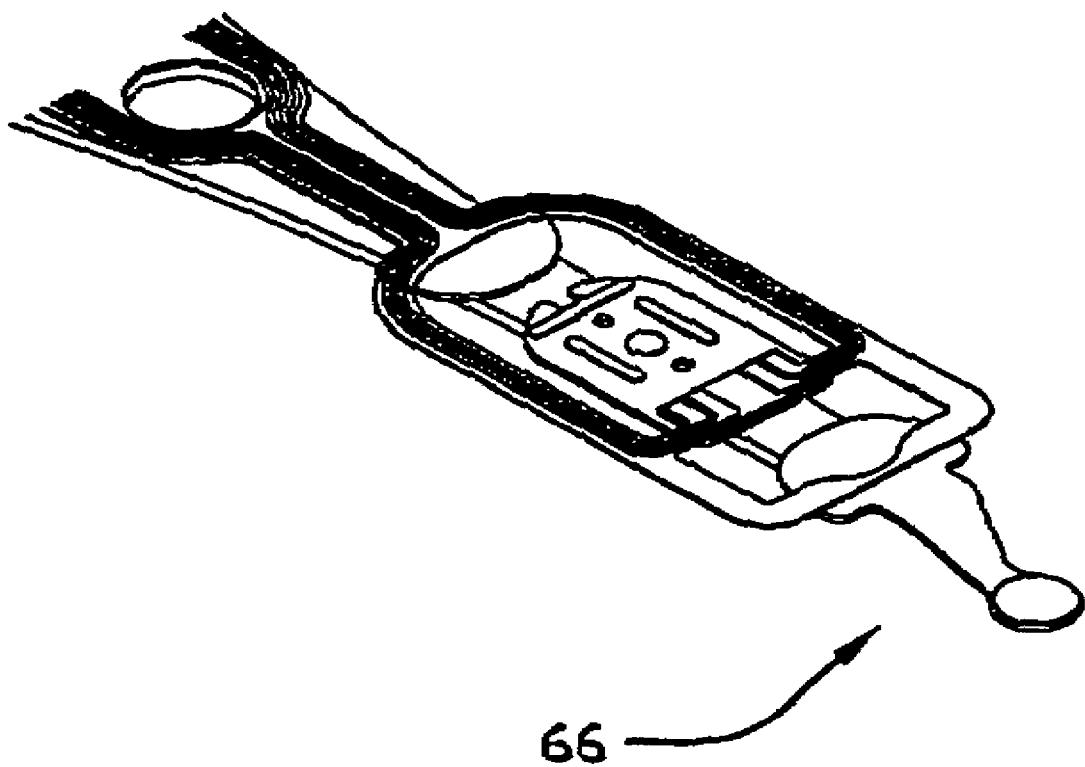
FIG. 11 is a fragmentary perspective view of a gimbal and load beam together with a headlift element useful in the practice of the present invention.

The thicker structural layer 54 may also be used to provide a headlift element or member 66, as shown in FIG. 11. The headlift member 66 must be stiff enough to support the head suspension as it is elevated by a ramp (not shown) to the side of the disk, to prevent contact with the disk when the disk is not rotating. An advantage of making the headlift member 66 as an extension of the structural layer is that the dielectric layer may be extended to that portion of the headlift member which contacts the ramp. This will provide a non metallic surface for the ramp to contact, eliminating wear particles and providing for lower friction between the headlift member and the ramp.

Figure 12A:
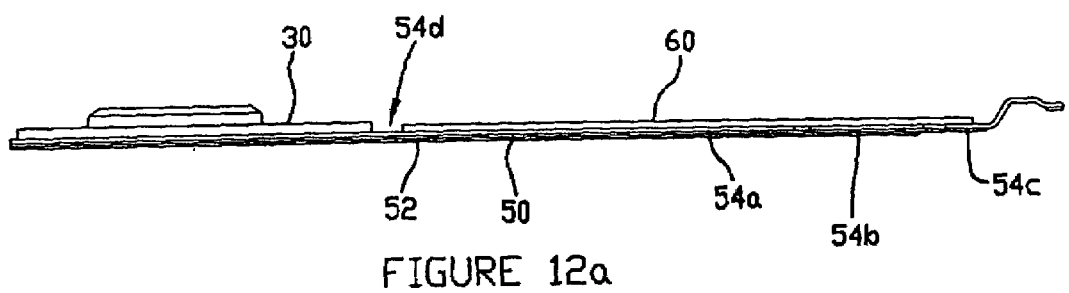
FIG. 12a is a side elevation view of the head suspension of FIG. 10.
Figure 12B:
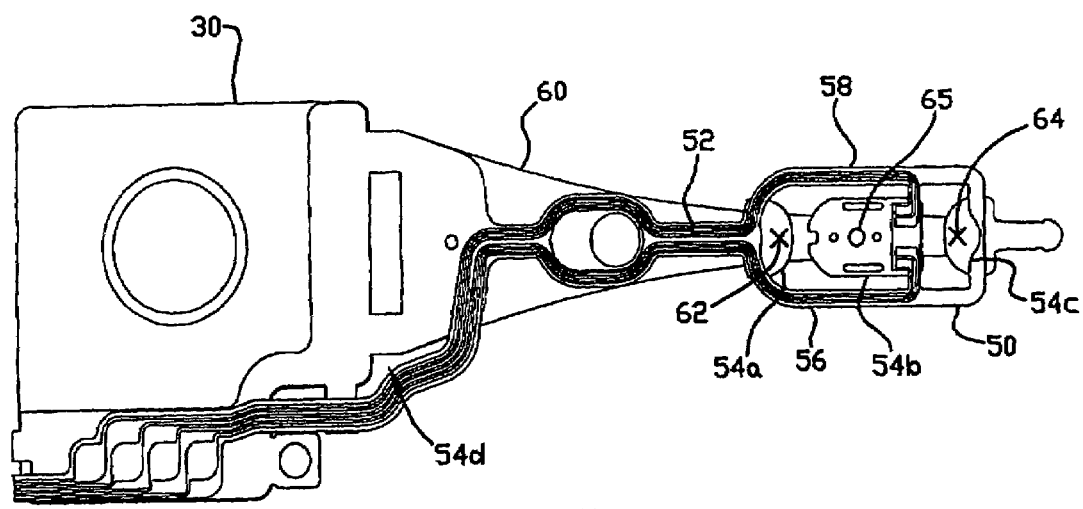
FIG. 12b is a plan view of the head suspension of FIG. 10.
Figure 13A:
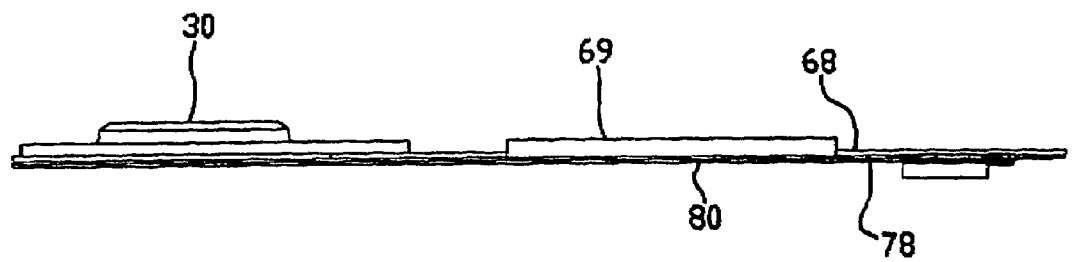
FIG. 13a is a side elevation view of a first alternative embodiment of a head suspension useful in the practice of the present invention.
Figure 13B:
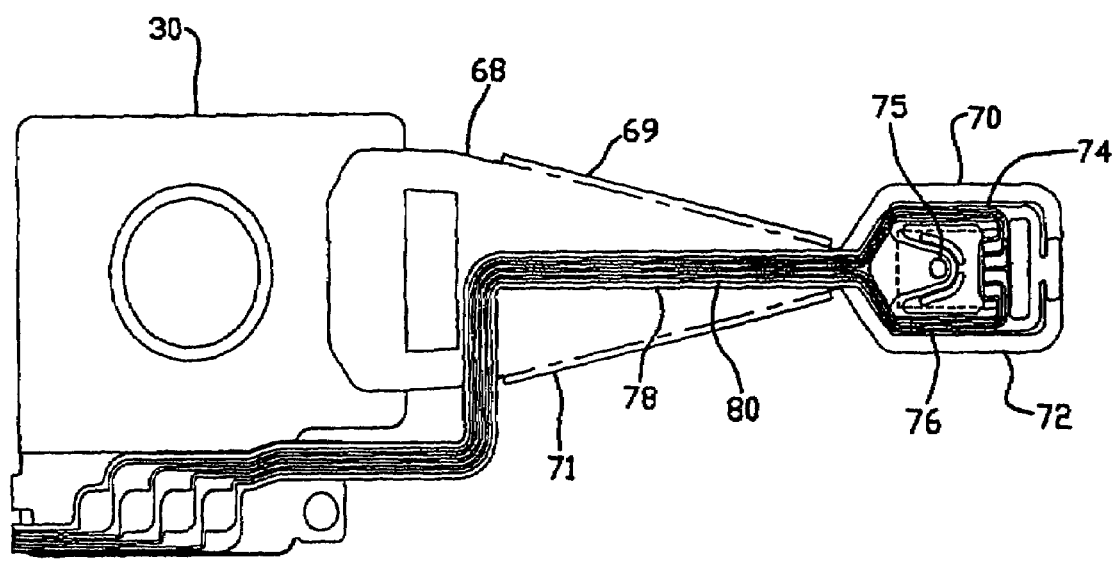
Figure 13C:
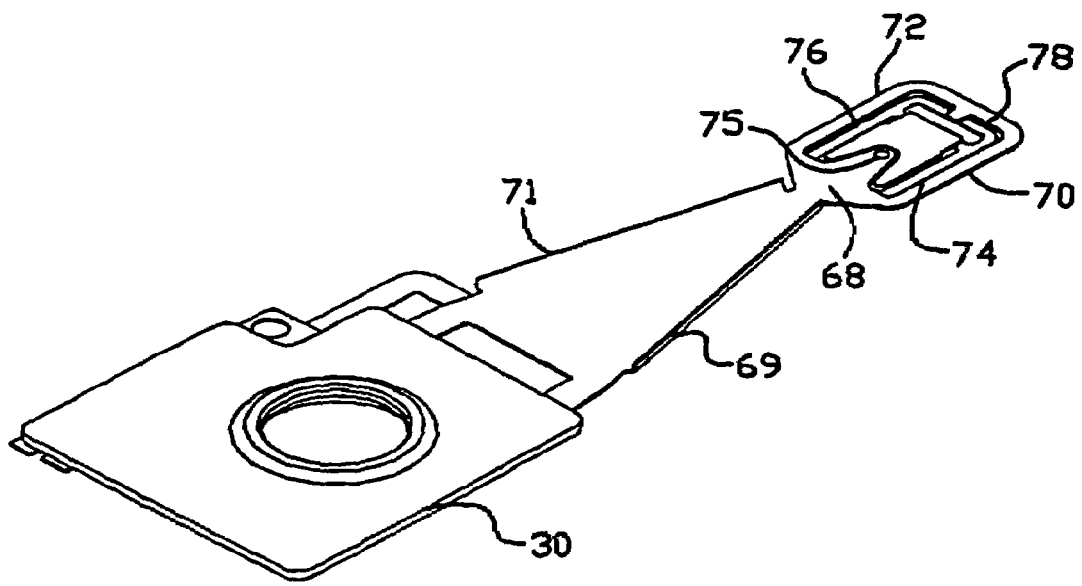
Figure 13D:
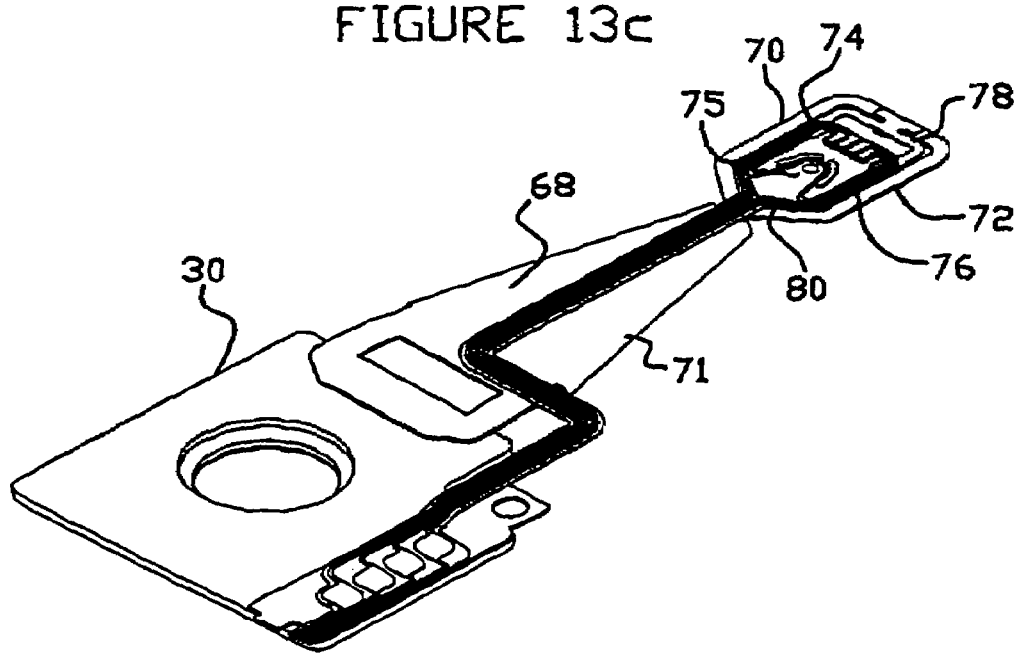
Figure 14A:
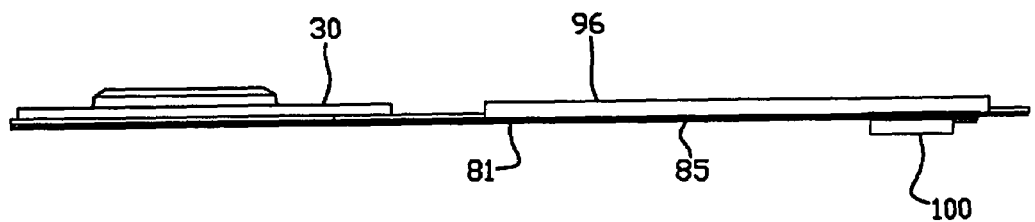
FIG. 14a is a side elevation view of a second alternative embodiment of a head suspension useful in the practice of the present invention.
Figure 14B:
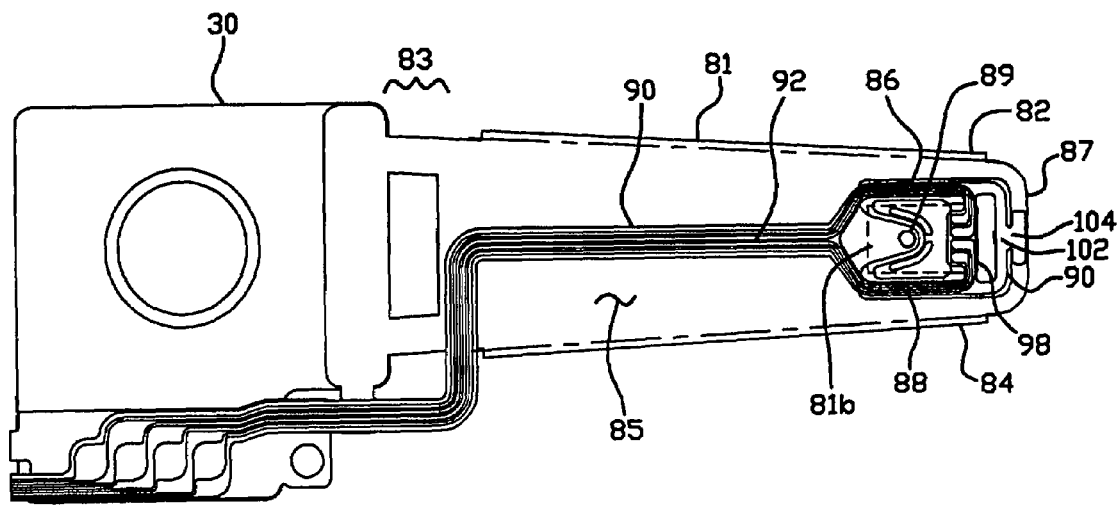
Figure 14C:
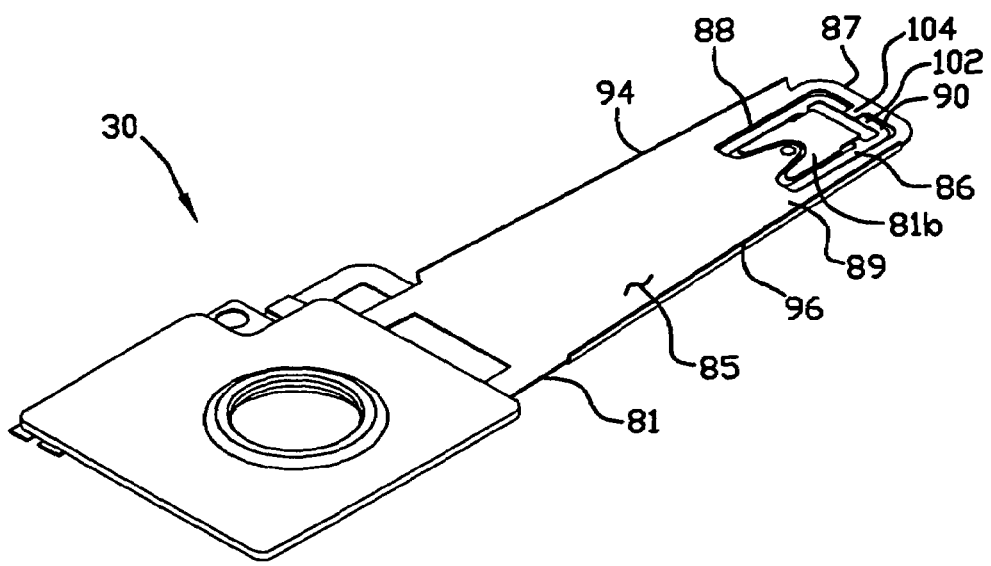
Figure 14D:
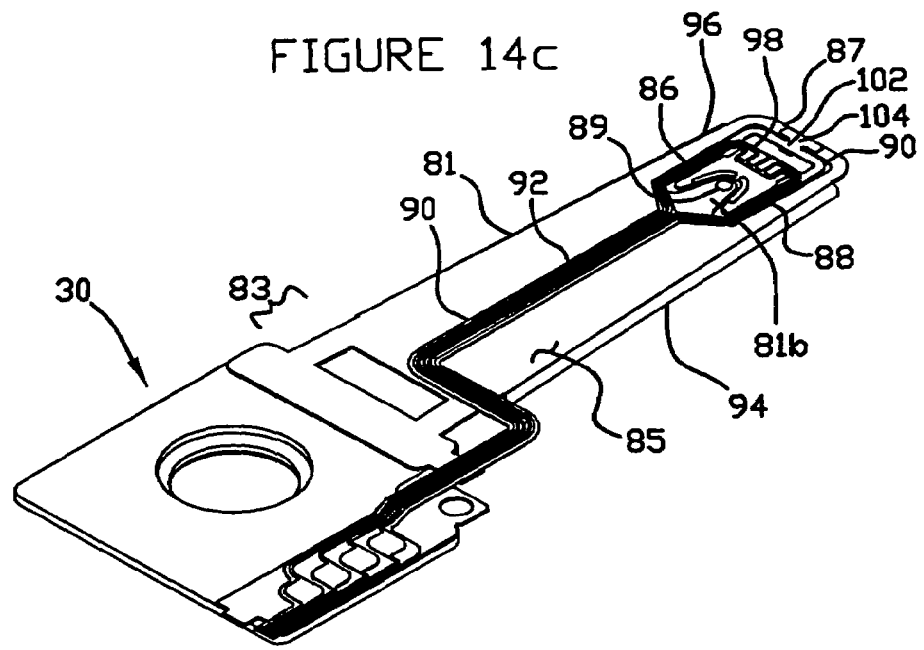

FIGS. 12a and 12b show a side view and a plan view of a head suspension including the metal-free gimbal arms 56 and 58, described above, using a discontinuous structural layer 54. As may be seen most clearly in FIG. 12b, the dielectric material 50 extends in the gimbal arms 56 and 58 from a proximal region on the baseplate side of the gimbal to a region distal of the gimbal to provide support for the distal segment 54c of the structural layer 54 where the distal attachment of the load beam 60 is positioned at attachment point 64 to provide lateral stiffness to this gimbal embodiment. The proximal attachment between the load beam 60 and structural layer is positioned proximal of the gimbal at attachment point 62.

The present invention has the additional advantage that a load point 65 may be formed integrally with the structural layer element 54b, thus eliminating the misalignment errors that could occur when the load point is formed in the separate load beam part 60. As is conventional, the load point may be a dimple or other salient feature such as an etched tower on which the gimbal may rest and pivot against the load beam. Other types of load points are also within the scope of the present invention, such as an etched triangle with one corner folded up to project out of the plane of element 54b. The load point provides a single point where the spring force from the suspension is applied to the head slider, while at the same time allowing a degree of freedom to pivot (via the gimbal) about the load point, to allow the head slider to conform to variations in the disk surface.

FIGS. 13a–13d show an alternative (second) design or embodiment for the present invention wherein a structural metal layer 68 is continuous from the baseplate to the distal region 46 beyond the gimbal. In this second embodiment, the metal arms 70, 72 do not form a part of the gimbal, but instead extend around the lateral sides of the gimbal assembly. The gimbal assembly in this embodiment has gimbal arms 74, 76 made up of dielectric 78 and conductors 80. In this embodiment, no separate load beam is used, since the structural layer 68 is sufficiently thick to serve the function of the load beam. Furthermore, laterally extending edges 69, 71 of structural layer 68 may be deformed out of the plane of layer 68 resulting in rails which stiffen the load beam area of layer 68. Perspective views of the second embodiment may be seen in FIGS. 13c and 13d. A load point shown generally at 75, may be included in this embodiment in the structural layer 68, as well, in the same manner as described for the first embodiment.

A still further (third) embodiment may be seen in FIGS. 14a–14d. In the third embodiment, the structural layer is again used to perform the function of the load beam, by providing a portion intermediate the spring region and the gimbal that is relatively stiff. In this embodiment a structural layer 81 extends from the baseplate 30, through a spring region 83, through a load beam region 85, through metal arms 82 and 84 to a first distal transverse bridge 87. Upturned edges 94, 96 form rails for the load beam region 85 of this embodiment. In this embodiment, gimbal arms 86, 88 are located inboard of the metal arms 82, 84 and include a dielectric layer 90 and a conductor layer 92. The conductors are routed along an intermediate transverse bridge 98 formed by the dielectric layer 90 and conductor layer 92 for electrical connection to a head slider 100 (see FIG. 14a). The dielectric layer 90 also includes a second distal transverse bridge 102. The first distal transverse bridge 87 (formed of the structural layer 81) and the second distal transverse bridge 102 (formed of the dielectric layer 90) are connected together at a tab 104, to provide high lateral stiffness for the gimbal of this embodiment. As has been described in the previous embodiments, a load point 89 may be formed in the structural layer 81 in this embodiment.

In this embodiment, the gimbal is made up of gimbal arms 86 and 88, the intermediate transverse bridge 98, and a head slider mounting portion 81b of the structural layer 81 and the load point 89. Typically, the structural layer 81 is stainless steel, the dielectric layer is polyimide, and the conductor layer is made up of copper traces or electrical conductors. It is to be understood that other materials, such as liquid crystal polymers, are suitable for the dielectric layer. As may be seen, the present invention, in a particular form, includes a laminate of copper traces, polyimide dielectric and stainless steel structural layer as a "flexure" but with the stainless steel layer omitted from the lateral arms in the gimbal region. Furthermore, it is to be understood that while traditional flexures are designed to cooperate only with a separate load beam, the present invention in some of its embodiments utilizes a portion of the structural layer itself as a load beam. In one aspect, a design having a separate load beam is preferable to increase stiffness and raise resonant frequency, for example, in applications such as server class drives and most desk top computer disk drives. In one aspect, the present invention may utilize a relatively wide design so that rails may be formed all the way to the tip. This is advantageous when a headlift is to be formed in a design without a separate load beam.

Reasons for integrating the load beam function into the flexure include reductions in cost and mass. Extremely low mass is possible. This is desirable for server and mobile drive applications. Low mass results in fast operation and good shock characteristics. Application of the present invention in server drives is believed to require the use of dampers, however, to minimize resonance effects.

In one aspect, the present invention, when applied to narrow designs which add bending and torsion modes of the gimbal, increases the first torsion frequency to an acceptable level. Increasing the width in the distal region will reduce and thus adversely affect the first torsion frequency.

Figure 15A:
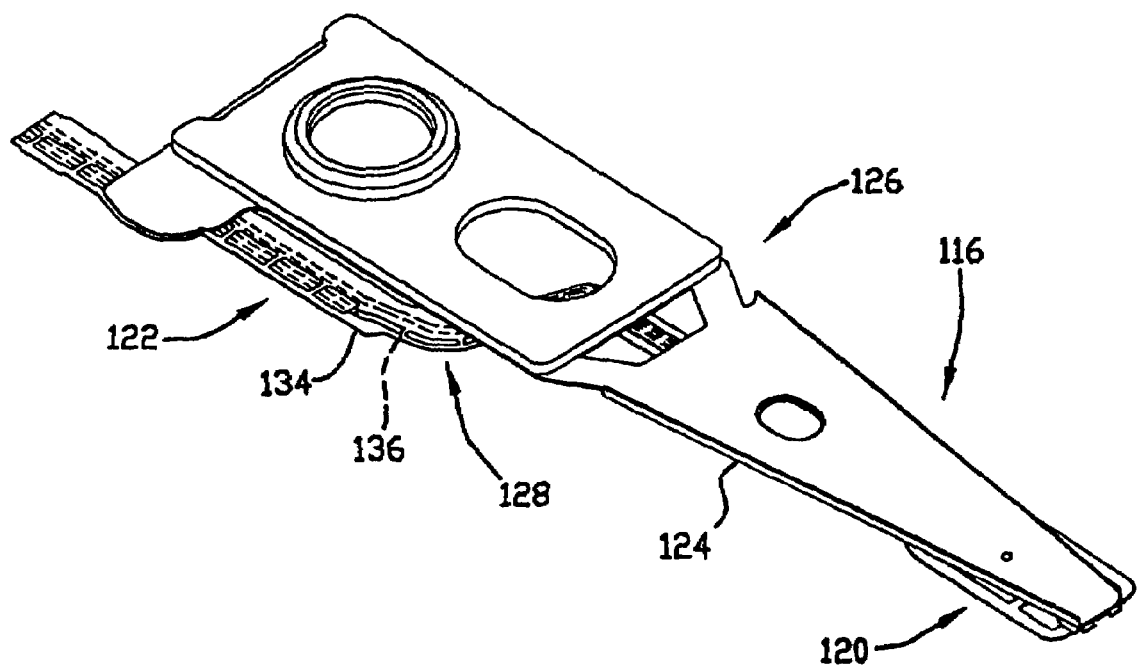
FIG. 15a is a perspective view of a still further alternative embodiment head suspension assembly according to the present invention.
Figure 15B:
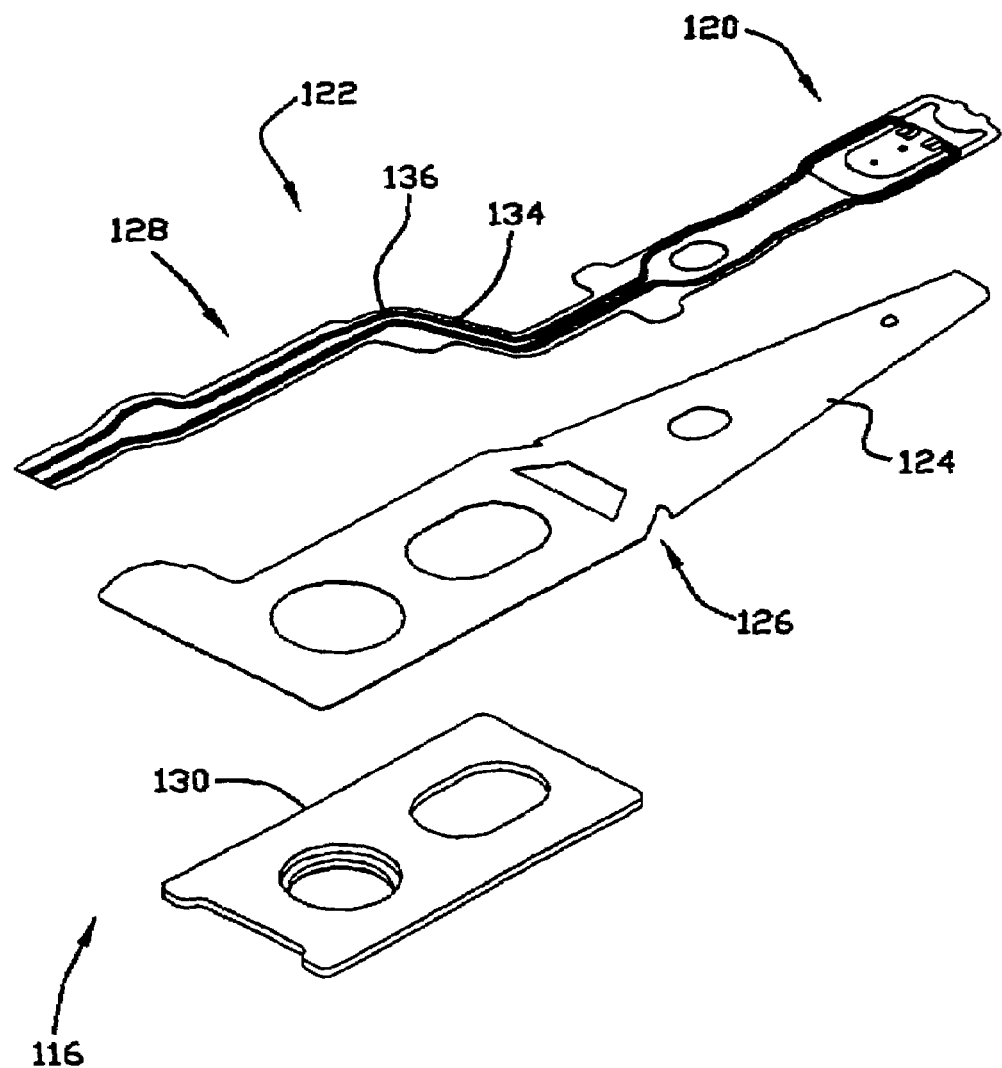

Another embodiment contemplated for the present invention is a design having a separate load beam and a low stiffness gimbal region for the flexure. Referring most particularly to FIGS. 15a and 15b, in this approach, a head suspension 116 has a flexure 122 with a gimbal region 120 substantially the same as that shown in FIGS. 6, 7, 8, 9 and 10. It is to be noted, however that an intermediate portion 128 including a trace layer 136 and a dielectric layer 134 of the flexure 122 is laterally spaced from the suspension 116.

The spring region in the present invention is preferably formed of the structural layer, eliminating parts and cost and difficulty of assembly. In each of the embodiments, the structural layer is preferably connected directly to the base plate 30 by welding. The structural layer in the embodiments of the present invention is preferably 38 μm thick stainless steel. In the second and third embodiments, metal arms 82, 84 do not form a part of the gimbal, but instead extend around the lateral sides of the gimbal assembly to provide mechanical support for a distal connection to the gimbal, to get high lateral stiffness concurrently with the low pitch and roll stiffness. The gimbal assembly in this embodiment has gimbal arms 86, 88 made up of dielectric 90 and conductors 92. Perspective views of the second embodiment may be seen in FIGS. 13c and 13d.

The nominal spring rate of the head suspensions formed using the present invention is 15.2 N/m. The first embodiment has a pitch stiffness of about 0.7 mN*mm/deg, along with a roll stiffness of about 0.7 mN*mm/deg. The lateral stiffness of the first embodiment is about 5.3 N/mm. The second and third embodiments have the following characteristics: Spring Rate: 15.2 N/m; and both Pitch and Roll stiffness: 0.7 mN*mm/deg.

This invention is not to be taken as limited to all of the details thereof as modifications and variations thereof may be made without departing from the spirit or scope of the invention.

What is claimed is:

1. An improved gimbal and load beam apparatus for a disk drive head suspension comprising:
    a. a dielectric layer having a proximal region and a distal region with respect to an intermediate region and a pair of arms spaced laterally apart from the intermediate region and extending longitudinally from the proximal region to the distal region;
    b. a plurality of electrically conductive traces formed on the dielectric layer and extending from the proximal region to at least the intermediate region for connection to a head slider; and
    c. a structural layer formed of metal and substantially absent from the arms of the dielectric layer and having
        i. a first portion secured to the dielectric layer at the proximal region thereof,
        ii. a second portion isolated from the first portion and secured to the dielectric layer at the distal region thereof;
        iii. a third portion isolated from the first and second portions and secured to the dielectric layer at the intermediate region, for supporting a head slider; and
    d. a load beam extending from the proximal region beyond the intermediate region to the distal region of the dielectric layer and attached to the structural layer at the proximal and distal regions of the dielectric layer.

2. The apparatus of claim 1 wherein the structural layer is steel.

3. The apparatus of claim 2 wherein the structural layer is stainless steel.

4. The apparatus of claim 3 wherein the load beam is stainless steel and the structural layer is attached to the load beam by welding.

5. The apparatus of claim 1 wherein the third portion further comprises a load point for head slider.

6. The apparatus of claim 1 wherein the dielectric layer has a transverse bridge extending between the arms in the intermediate region.

7. The apparatus of claim 1 wherein the structural layer extends proximally to form a spring region for the gimbal and load beam.

8. The apparatus of claim 7 further comprising
    e. a baseplate connected to the structural layer proximal of the spring region.

9. The apparatus of claim 1 wherein the second region of the structural layer extends from the distal region to form a headlift member.

10. The apparatus of claim 9 wherein the dielectric layer extends from the distal region to at least a portion of the headlift member.

11. A flexure and load beam assembly comprising:
    a. a flexure having a first layer of metal, a second layer of insulating material mounted on the first layer, and a third layer of a plurality of electrical conductors mounted on the second layer, the flexure having a gimbal region and wherein at least portions of the gimbal region are free of the first layer of metal; and b. a load beam secured to the flexure only at locations proximal and distal of the gimbal region.

12. The assembly of claim 11 wherein the gimbal region has a generally planar surface and a load point projecting out of the generally planar surface.

13. The assembly of claim 11 wherein the load point is formed in the first layer of metal.

14. The assembly of claim 11 wherein the metal of the first layer is stainless steel.

15. The assembly of claim 11 wherein the flexure is secured to the load beam by welding.

16. The assembly of claim 11 wherein the flexure is secured to the load beam by adhesive.

17. The assembly of claim 11 wherein the first layer of metal extends past a distal end of the gimbal region to form a headlift extension.

18. The assembly of claim 17 wherein the second layer of insulating material extends to at least a portion of the headlift extension.

* * * * *